(12) United States Patent
Kraus et al.

(10) Patent No.: US 8,566,209 B2
(45) Date of Patent: *Oct. 22, 2013

(54) SYSTEM AND METHOD FOR RISK MANAGEMENT

(71) Applicant: Trading Technologies International, Inc., Chicago, IL (US)

(72) Inventors: Henrik Kraus, Wilmette, IL (US); Farley Owens, Chicago, IL (US); Jens-Uwe Schluetter, Evanston, IL (US)

(73) Assignee: Trading Technologies International, Inc, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/740,893

(22) Filed: Jan. 14, 2013

(65) Prior Publication Data
US 2013/0132259 A1    May 23, 2013

Related U.S. Application Data

(63) Continuation of application No. 13/470,391, filed on May 14, 2012, now Pat. No. 8,380,599, which is a continuation of application No. 13/161,308, filed on Jun. 15, 2011, now Pat. No. 8,255,313, which is a continuation of application No. 12/559,480, filed on Sep. 14, 2009, now Pat. No. 7,991,667, which is a continuation of application No. 10/339,947, filed on Jan. 10, 2003, now Pat. No. 7,603,303.

(60) Provisional application No. 60/429,185, filed on Nov. 26, 2002.

(51) Int. Cl.
*G06Q 40/00* (2012.01)
*G06Q 40/06* (2012.01)

(52) U.S. Cl.
CPC ..................................... *G06Q 40/06* (2013.01)

USPC ............... 705/36 R; 705/35; 705/37; 705/38; 705/39; 705/40; 705/42; 705/45; 705/26

(58) Field of Classification Search
USPC ............................... 705/35, 37, 38, 39, 45, 26
See application file for complete search history.

(56) References Cited

U.S. PATENT DOCUMENTS 5,557,517 A * 9/1996 Daughterty, III ................ 705/37
5,963,923 A * 10/1999 Garber ............................ 705/37
(Continued)

FOREIGN PATENT DOCUMENTS

WO     00/48113 A1     8/2000
WO     00/65510 A1     11/2000

OTHER PUBLICATIONS

U.S. Appl. No. 11/415,996, filed May 2, 2006, Kraus, et al.
(Continued)

*Primary Examiner* — Tien Nguyen
(74) *Attorney, Agent, or Firm* — McDonnell Boehnen Hulbert & Berghoff LLP

(57) ABSTRACT

A margin requirement is computed while trading. The margin requirement may be calculated while trading because the preferred system takes into account working orders to generate the margin requirement. The on the fly possibility allows the preferred system to provide pre-trade risk calculations, but can also be used to provide post-trade calculations. A generic spread number and the maximum number of outright positions are determined. Using the spread positions and the maximum number of outright positions, a spread margin and an outright margin are calculated, which when summed provide a total margin requirement. Limits based in part on the total margin requirement may be imposed on one or more traders.

20 Claims, 8 Drawing Sheets

(56) References Cited

U.S. PATENT DOCUMENTS

| | | | |
|---|---|---|---|
| 6,064,985 A * | 5/2000 | Anderson | 705/36 R |
| 6,321,212 B1 * | 11/2001 | Lange | 705/36 R |
| 6,421,653 B1 | 7/2002 | May et al. | |
| 6,938,009 B1 * | 8/2005 | Herbst et al. | 705/36 R |
| 7,024,384 B2 | 4/2006 | Daughtery, III | |
| 7,039,610 B2 | 5/2006 | Morano et al. | |
| 7,146,336 B2 | 12/2006 | Olsen et al. | |
| 7,149,713 B2 | 12/2006 | Bove et al. | |
| 7,243,083 B2 | 7/2007 | Burns et al. | |
| 7,418,420 B2 | 8/2008 | Billings et al. | |
| 7,430,532 B2 | 9/2008 | Wizon et al. | |
| 7,437,325 B2 | 10/2008 | Kemp, II et al. | |
| 7,584,130 B1 | 9/2009 | Schluetter | |
| 7,603,303 B1 | 10/2009 | Kraus et al. | |
| 7,693,774 B2 | 4/2010 | Howorka et al. | |
| 7,792,735 B1 | 9/2010 | Schluetter | |
| 7,890,412 B2 * | 2/2011 | Morano et al. | 705/37 |
| 7,991,667 B2 | 8/2011 | Kraus et al. | |
| 8,255,313 B2 | 8/2012 | Kraus et al. | |
| 2001/0049651 A1 | 12/2001 | Selleck | |
| 2001/0056392 A1 | 12/2001 | Daughtery, III | |
| 2002/0004774 A1 | 1/2002 | Defarlo | |
| 2002/0103742 A1 * | 8/2002 | Billings et al. | 705/37 |
| 2002/0116317 A1 | 8/2002 | May | |
| 2002/0133455 A1 | 9/2002 | Howorka et al. | |
| 2002/0188544 A1 | 12/2002 | Wizon et al. | |
| 2002/0194115 A1 | 12/2002 | Nordlicht et al. | |
| 2003/0009419 A1 | 1/2003 | Chavez et al. | |
| 2003/0163404 A1 | 8/2003 | Hu et al. | |
| 2003/0200167 A1 | 10/2003 | Kemp, II et al. | |
| 2004/0024692 A1 | 2/2004 | Turbeville et al. | |
| 2005/0038731 A1 | 2/2005 | Sweeting et al. | |
| 2010/0005036 A1 | 1/2010 | Kraus et al. | |
| 2010/0211523 A1 | 8/2010 | Schluetter | |
| 2011/0246353 A1 | 10/2011 | Kraus et al. | |
| 2012/0226598 A1 | 9/2012 | Kraus et al. | |

OTHER PUBLICATIONS

Chicago Board Options Exchange Margin Manual, Chicago Board Options Exchange, Inc., Apr. 2000, pp. 1-41.

Collins, D.P., "CME Extends Margin Allowances for FCMs," *Futures*, Oct. 2002, vol. 31, No. 13, ProQuest Central, p. 14.

"Futures and Index Options Risk Management System: HKCC: Client Managing System at the Hong Kong Futures Exchange" Document [online], Hong Kong Futures Exchange (HKFe), 6 pages. [Retrieved on Dec. 2, 2002] from the Internet: http://www.hkex.com.hk/rulereg/futrsksys/futrsksys2.htm.

Hardouvelis, G.A. and Kim, D., "Margin Requirements, Price Fluctuations, and Market Participation in Metal Futures," *Journal of Money, Credit and Banking*, Aug. 1995, vol. 7, No. 3, ProQuest Central, p. 659.

"Review of Standard Portfolio Analysis of Risk ("SPAN") Margin System as Implemented by the Chicago Mercantile Exchange Board of Trade Clearing Corporation and the Chicago Board of Trade" Document, Commodity Futures Trading Commission Division of Trading and Markets, Apr. 2001, pp. 1-16.

Sydney Futures Exchange Clearing House PTY Limited: "Standard Portfolio of Risk" Document, Sydney Futures Exchange, 1998, 8 pages.

Sutphen, L.R., "Risk Controls: New Demands from FCMs alter Vendor Development Plans" [online], *Futures Industry*, FIA, Apr./May 2001, 4 pages. [Retrieved on Sep. 3, 2007] from the Internet: http://www.futuresindustry.org/fi-magazine-home.asp?v=p&a=696.

Trading Technologies "Risk Inserter" Document, TT Professional Services, Trading Technologies International, Inc., n.d., 1 page.

Trading Technologies "X_RISK: Risk Monitoring and Trader Administration for X_TRADER" Document, Trading Technologies International, Inc., n.d., 2 pages.

Trading Technologies "X_TRADER: X_RISK" Webpage [online], Trading Technologies International, Inc., n.d., 1 page. [Retrieved on Jun. 14, 2007] from the Internet: http://www.tradingtechnologies.com/xrisk.aspx.

Trading Technologies "X_RISK Plus: Streamline Your Risk Management; Comprehensive Fast Reporting; Visual and Audible Alert System" Version 6.2 Document, Trading Technologies International, Inc., n.d., 2 pages.

Trading Technologies "X_RISK Plus: Minimize Trading Errors" Version 6.2 Document, Trading Technologies International, Inc., n.d., 2 pages.

Trading Technologies "X_RISK: Risk Management for the X_TRADER Order Entry System" Document, Trading Technologies International, Inc., n.d., 2 pages.

Trading Technologies "X_RISK: X_RISK Enables Risk Manager, Desk Managers and Permissioned Traders to Monitor the Trading Activity for all Traders/Customers, Across All Exchanges, From Any Location" Document, Trading Technologies International, Inc., n.d., 2 pages.

* cited by examiner

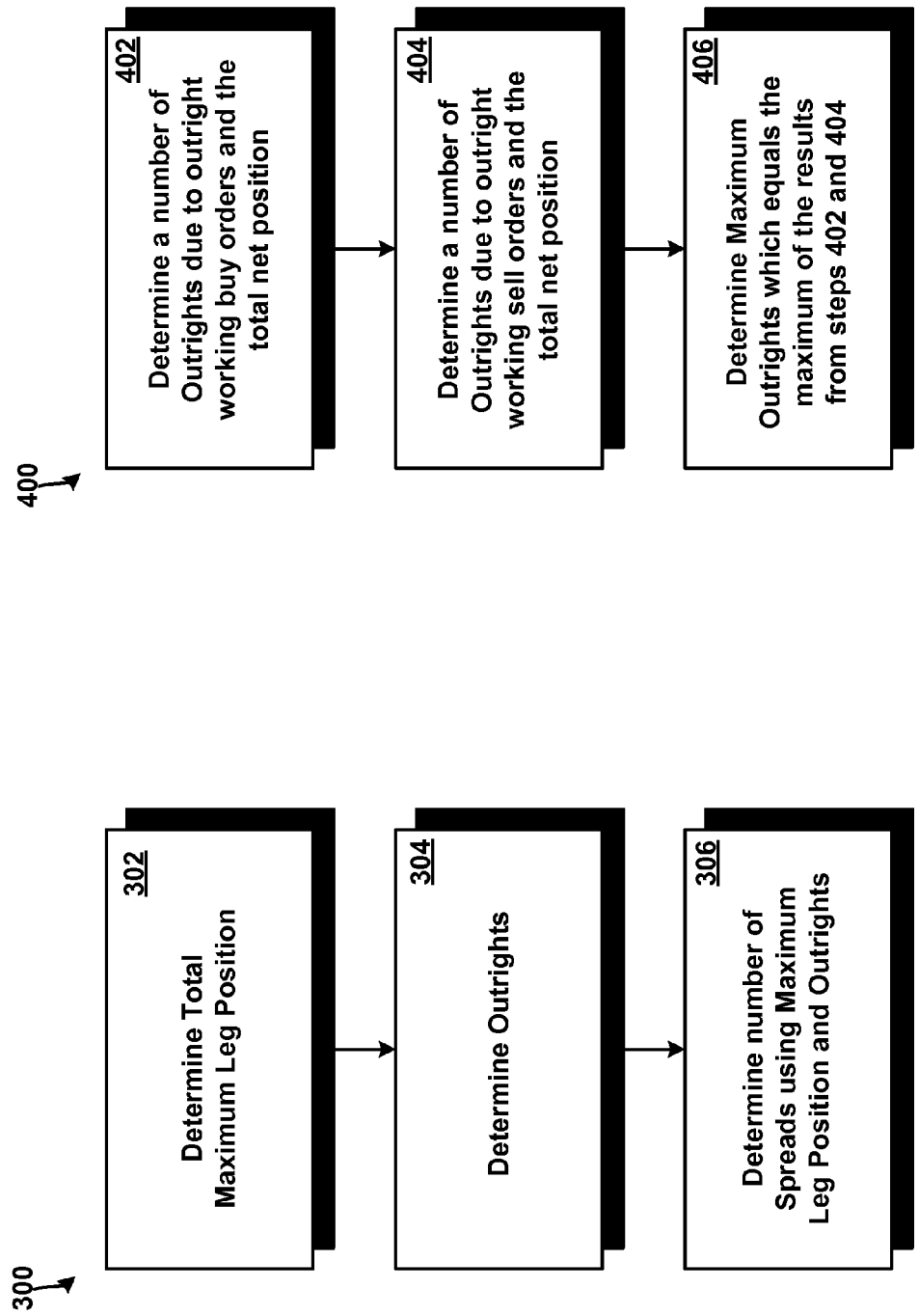

| | INPUTS | | | | | | CALCULATIONS |
|---|---|---|---|---|---|---|---|
| | Filled Positions | | Outright Positions | | Positions Based on Spreads | | |
| Month | Net Long | Net Short | W Buy | W Sell | W Buy | W Sell | Max Leg Position |
| March | 0 | 0 | 1 | 0 | 0 | 0 | 0 |
| June | 0 | 0 | 0 | 0 | 0 | 0 | 0 |
| September | 0 | 0 | 0 | 0 | 0 | 0 | 0 |
| December | 0 | 0 | 0 | 0 | 0 | 0 | 0 |
| TOTAL | 0 | 0 | 1 | 0 | — | — | 0 |

| CALCULATIONS CONTINUED | | |
|---|---|---|
| Spreads | 0 | S - Margin (Base = 10) | 0 |
| Outrights | 0 | O - Margin (Base = 100) | 100 |
| Max Outrights | 1 | TOTAL MARGIN | 100 |

FIG. 5

| | INPUTS | | | | | | CALCULATIONS |
|---|---|---|---|---|---|---|---|
| | Filled Positions | | Outright Positions | | Positions Based on Spreads | | |
| Month | Net Long | Net Short | W Buy | W Sell | W Buy | W Sell | Max Leg Position |
| March | 0 | 0 | 1 | 0 | 0 | 0 | 0 |
| June | 0 | 0 | 0 | 1 | 0 | 0 | 0 |
| September | 0 | 0 | 0 | 0 | 0 | 0 | 0 |
| December | 0 | 0 | 0 | 0 | 0 | 0 | 0 |
| TOTAL | 0 | 0 | 1 | 1 | — | — | 0 |

| CALCULATIONS CONTINUED | | S - Margin (Base = 10) | O - Margin (Base = 100) | TOTAL MARGIN |
|---|---|---|---|---|
| Spreads | 0 | 0 | | |
| Outrights | 0 | | 100 | |
| Max Outrights | 1 | | | 100 |

FIG. 6

| | INPUTS | | | | | | CALCULATIONS |
|---|---|---|---|---|---|---|---|
| | Filled Positions | | Outright Positions | | Positions Based on Spreads | | |
| Month | Net Long | Net Short | W Buy | W Sell | W Buy | W Sell | Max Leg Position |
| March | 1 | 0 | 0 | 0 | 0 | 0 | 1 |
| June | 0 | 0 | 0 | 1 | 0 | 0 | 0 |
| September | 0 | 0 | 0 | 0 | 0 | 0 | 0 |
| December | 0 | 0 | 0 | 0 | 0 | 0 | 0 |
| TOTAL | 1 | 0 | 0 | 0 | — | — | 1 |

| CALCULATIONS CONTINUED | | |
|---|---|---|
| Spreads | 0 | S - Margin (Base = 10) | 0 |
| Outrights | 1 | O - Margin (Base = 100) | 100 |
| Max Outrights | 1 | TOTAL MARGIN | 100 |

FIG. 7

| | INPUTS | | | | | | CALCULATIONS |
|---|---|---|---|---|---|---|---|
| | Filled Positions | | Outright Positions | | Positions Based on Spreads | | |
| Month | Net Long | Net Short | W Buy | W Sell | W Buy | W Sell | Max Leg Position |
| March | 1 | 0 | 0 | 0 | 0 | 0 | 1 |
| June | 0 | 1 | 0 | 0 | 0 | 0 | 1 |
| September | 0 | 0 | 0 | 0 | 0 | 0 | 0 |
| December | 0 | 0 | 0 | 0 | 0 | 0 | 0 |
| TOTAL | 1 | 1 | 0 | 0 | — | — | 2 |

| CALCULATIONS CONTINUED | | |
|---|---|---|
| Spreads | 1 | S - Margin (Base = 10) | 10 |
| Outrights | 0 | O- Margin (Base = 100) | 0 |
| Max Outrights | 0 | TOTAL MARGIN | 10 |

FIG. 8

| | INPUTS | | | | | | CALCULATIONS |
|---|---|---|---|---|---|---|---|
| | Filled Positions | | Outright Positions | | Positions Based on Spreads | | |
| Month | Net Long | Net Short | W Buy | W Sell | W Buy | W Sell | Max Leg Position |
| March | 1 | 0 | 0 | 0 | 1 | 0 | 2 |
| June | 0 | 1 | 0 | 0 | 0 | 1 | 2 |
| September | 0 | 0 | 0 | 0 | 0 | 0 | 0 |
| December | 0 | 0 | 0 | 0 | 0 | 0 | 0 |
| TOTAL | 1 | 1 | 0 | 0 | — | — | 4 |

| CALCULATIONS CONTINUED | | | |
|---|---|---|---|
| Spreads | 2 | S - Margin (Base = 10) | 20 |
| Outrights | 0 | O - Margin (Base = 100) | 0 |
| Max Outrights | 0 | TOTAL MARGIN | 20 |

| | INPUTS | | | | | | CALCULATIONS |
|---|---|---|---|---|---|---|---|
| | Filled Positions | | Outright Positions | | Positions Based on Spreads | | |
| Month | Net Long | Net Short | W Buy | W Sell | W Buy | W Sell | Max Leg Position |
| March | 2 | 0 | 0 | 0 | 0 | 0 | 2 |
| June | 0 | 2 | 0 | 0 | 0 | 0 | 2 |
| September | 0 | 0 | 0 | 0 | 0 | 0 | 0 |
| December | 0 | 0 | 0 | 0 | 0 | 0 | 0 |
| TOTAL | 2 | 2 | 0 | 0 | — | — | 4 |

| CALCULATIONS CONTINUED | | |
|---|---|---|
| Spreads | 2 | S - Margin (Base = 10) | 20 |
| Outrights | 0 | O - Margin (Base = 100) | 0 |
| Max Outrights | 0 | TOTAL MARGIN | 20 |

SYSTEM AND METHOD FOR RISK MANAGEMENT

CROSS REFERENCE TO RELATED APPLICATIONS

The present application is a continuation of U.S. patent application Ser. No. 13,470,391, filed May 14, 2012, now U.S. Pat. No. 8,380,599, which is a continuation of U.S. patent application Ser. No. 13/161,308, filed Jun. 15, 2011, now U.S. Pat. No. 8,255,313, which is a continuation of Ser. No. 12/559,480, filed Sep. 14, 2009, now U.S. Pat. No. 7,991,667, which is a continuation of Ser. No. 10/339,947, filed on Jan. 10, 2003, now U.S. Pat. No. 7,603,303, which claims priority to U.S. Provisional Patent Application No. 60/429,185, filed Nov. 26, 2002. The entire disclosure contents of these applications are herewith incorporated by reference into the present application.

FIELD OF THE INVENTION

The present invention is related to electronic exchanges and in particular, the present invention is directed towards a system and method for risk management.

BACKGROUND

An electronic exchange provides a matching process between buyers and sellers. Some well known electronic exchanges include Eurex, London International Financial Futures and Options Exchange ("LIFFE"), Euronext, Chicago Mercantile Exchange ("CME"), Chicago Board of Trade ("CBOT"), Xetra, and Island. Buyers and sellers, collectively referred to as traders, are typically connected to one or more electronic exchanges by way of a communication link. The traders submit buy or sell orders to the electronic exchange over the communication link. They also obtain price information and order fill information from the exchange.

Electronic exchanges are becoming successful venues for trading. Indeed, an increasing number of people are actively participating in a market at any one given time. The increase in the number of potential market participants has advantageously led to, among other things, a more competitive market and greater liquidity than with traditional methods of trading, such as open outcry.

Traders sometimes prefer to trade only one tradeable object at a time, and sometimes traders wish to trade more than one tradeable object at a time in a strategy referred to as spreading or strategy trading. As used herein, tradeable objects may include, but are not limited to, all types of traded financial products, such as, for example, stocks, options, bonds, futures, currency, and warrants, as well as funds, derivatives and collections of the foregoing. Moreover, tradeable objects may include all types of commodities, such as grains, energy, and metals. A tradeable object may be "real", such as products that are listed by an exchange for trading, or "synthetic", such as a combination of real products that is created by the trader. A tradeable object could actually be a combination of other tradeable object, such as a class of tradeable objects.

As mentioned above, some traders trade one tradeable object. For example, a trader might trade the June 2002 corn contract. That is, the trader is offering to buy or willing to sell the corn contract, depending on his or her trading strategy. Likewise, a trader might trade a December 2003 corn contract, a corn contract from another month or another type of contact altogether. As is common, however, traders may trade more than one tradeable object at a time. For example, a trader may buy multiple different tradeable objects, sell multiple different tradeable objects, or buy and sell a combination of different tradeable objects. While the different buys and sells may comprise unrelated positions for the trader, they may alternatively be part of a specific trading strategy—such as a spread.

Spreading is a trading strategy that traders might use to hedge risk. That is, a spread can be used to reduce the trader's downside risk of trading a tradeable object. A spread generally includes buying at least one tradeable object and, usually at the same time, selling at least one different tradeable object. For example, a trader could spread trade the June 2002 corn contract and the December 2003 corn contract, such as buying the June 2002 corn contract and selling the December 2003 corn contract, or vice versa.

In this example, the June/December corn contract spread has two legs. The June 2002 corn contact makes one leg, while the December 2003 corn contract makes the second leg. The legs refer to the portions of the trade associated with each individual tradeable object, which can also be referred to as an outright market. A spread, however, can have more than two legs. Additionally, spreads can be created based on relationships other than calendar months. One such example would be trading a 10 year note and a 5 year note, however, other examples also exist.

As previously described, spreads may reduce a trader's downside risk when compared to trading a single outright position. The tradeable objects comprising the legs of a spread ordinarily share a price correlation. Thus, their prices generally move in the same direction. For example, a decrease in the price of one leg would then generally correspond to a decrease in the price of another leg. Placing opposing trades, such as buying one leg and selling the other leg, reduces the potential downside risk, because a decrease in the price of one leg (e.g., the buy leg) that causes the trader to lose money would be offset by the corresponding decrease in the price of the other leg (e.g., the sell leg) that causes the trader to gain money.

Common to trading most tradeable objects, when a trader places an order for a tradeable object, the trader needs only to put up a fraction of the value of the tradeable object. This is oftentimes referred to as margin trading, and it allows the trader to trade a much larger amount of the tradeable object than if the trader simply bought or sold the tradeable object outright (e.g., by paying cash). In order to trade on margin, a trader generally deposits a certain amount of cash in a margin account with a trading house, which the trader uses to access the exchange. In return, the trading house grants the trader a margin balance, which is typically greater than the amount of cash the trader deposited in the margin account. The trader can then buy and sell tradeable object against the margin balance.

Each tradeable object position held by a trader, whether a long position or a short position, has associated with it a margin requirement, sometimes also called a margin amount. The margin requirement generally refers to an amount of margin required to hold that position. When the trader's initial order for position is filled, the margin requirement for that position is deducted from the trader's margin account. The margin requirement for that position, however, does not necessarily remain fixed. Changes in the market price for the position may cause a corresponding change in the position's margin requirement, thereby also affecting the balance in the trader's margin account. Of course, factors other than the market price for the position may alter the margin requirement.

Usually, a clearing house computes the margin requirements after every trading session, sometimes referred to as post-trade risk calculation. There are many different types of margin requirements usually depending on the type of tradeable object and clearing house. However, in general, a spread position is usually considered to be a lower risk strategy than an outright long or an outright short position, and therefore margin requirements for spreads are often much less than for outright positions. For example, if the price trend of a tradeable object is currently up and the trader is in a spread, (e.g., short one month and long another) the gain on the long position would likely offset the loss of the short position, and vice-versa. One side of the spread typically hedges the other, therefore the lower margin requirements.

One well known tool for computing margin requirements in circumstances such as these is Standard Portfolio Analysis of Risk ("SPAN"), which is a margining system developed by the Chicago Mercantile Exchange ("CME"). SPAN uses a set of pre-determined parameters set by the clearing house to assess what the maximum potential loss will be for a given portfolio over a one-day period. SPAN and systems like SPAN are typically used at the end of the trading day to recompute margin requirements for a trader's outstanding positions and thereby to also recompute the available margin in the trader's margin account.

The parameters used by SPAN in computing the margin requirements can take into account various different factors. For example, SPAN can recognize that two opposing outright positions of similar tradeable objects (e.g., a buy of one tradeable object and a sell of another similar tradeable object) may in fact comprise a spread. Thus, instead of trading the spread as a single tradeable object (e.g., trading in a spread market), the trader may have separately purchased the legs of the spread (e.g., trading individual legs in an outright market). As previously explained, the spread has less of a risk associated with it than with uncorrelated outright positions. Therefore, the two outright positions comprising the spread should have a lower margin requirement than if they were considered as separate outright positions.

The margin requirement calculations performed by SPAN, while accounting for many different market factors, are computationally intensive. Therefore, they are not well suited for real-time use while the exchange is open for trading. If they were used during the trading day, for example as a pre-trade calculation to determine if a trader has enough available margin to place a trade, they would cause an unreasonable delay in executing the trade. This may cause the trader to miss placing the trade, for example, if the market had already moved away from the trader's order price, or they may cause the trader to have a less advantageous position in the queue for open orders at the particular price level for that trade. Additionally, as SPAN was designed for use at the end of the trading day, it does not take into account the margin requirements of working orders.

In spite of the limitations of SPAN, trading houses and individual traders still attempt to keep track of their margin requirements throughout the day; however, this is currently done with much more simplistic methods. Current pre-trade calculations are usually done by determining the number of markets in which a trader has a position and then multiplying those positions by the margin requirement for outright legs. These quick calculations are not sophisticated enough to determine which of the outright positions may in fact comprise legs of a spread. Therefore, such calculations assume that the trader is only trading in outright long or short positions and not spread positions. As a result, the margin requirements are typically higher than they should be, which is not an accurate representation of the true margin requirements of the positions taking into account spreads and other trading strategies.

Therefore, there exists a need for an improved risk management system that can be used for real time pre-trade risk calculations.

BRIEF DESCRIPTION OF THE FIGURES

The presently preferred embodiments of the present invention are described herein with reference to the drawings, in which:

FIG. 3 shows a method in accordance with the preferred embodiment for determining the number of spread positions;

FIG. 4 shows a method in accordance with the preferred embodiment for determining the maximum number of outright positions; and FIGS. 5-10 show example inputs into the preferred system of FIG. 1, result of the calculations performed by the system, and the system's output including the computed total margin requirement.

DETAILED DESCRIPTION

I. Overview

Figure 1:
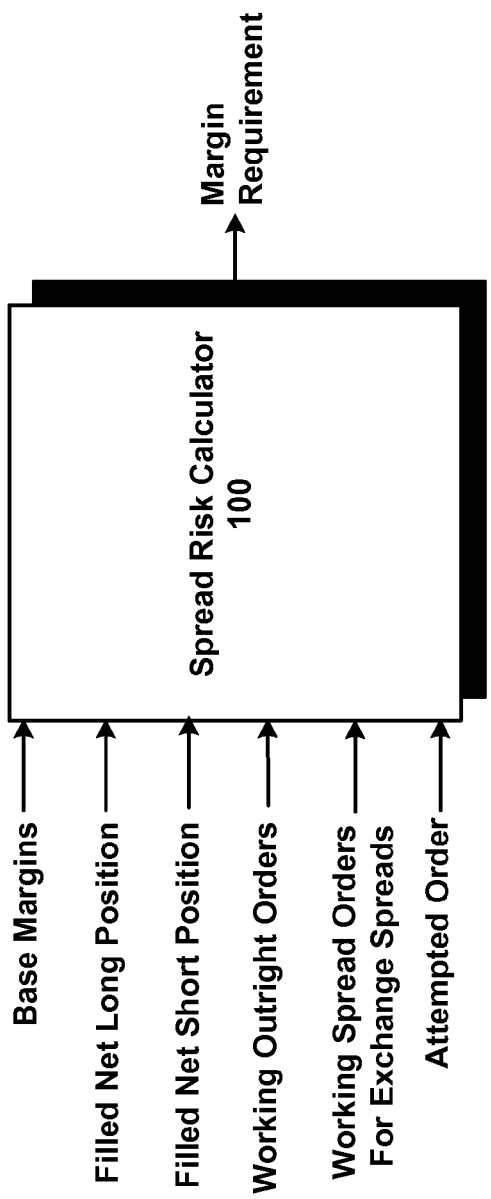
FIG. 1 shows a system in accordance with the preferred embodiments for receiving inputs and for determining a margin requirement based on the received inputs.

A system and method are described herein to calculate a margin requirement on the fly while trading, if so desired. The margin requirement may be calculated on the fly because it takes into account working orders to generate the margin requirement. The on the fly possibility allows the preferred system to provide pre-trade risk calculations. Pre-trade calculations generally refer to calculating the margin throughout the trading day, rather than just at the end of the day. Alternatively, the system can be implemented at the end of the day or at any other time to provide post-trade risk calculations.

Using the system of the preferred embodiment, certain limits based on the computed margin requirement can be imposed on one or more traders. These imposed limits are more realistic than previously possible with a conventional system because the preferred system accounts for orders that are working in various markets (e.g., outright markets and/or exchange spread markets) in addition to the trader's filled net position to generate a number of spreads and a number of outrights. Then, a more accurate margin requirement may be calculated based on the computed number of spreads and the computed number of outrights, which better models the potential risk. As a result, the trader or traders can be more confident that the computed margin requirement is more accurate and thus the limits imposed on them are more realistic than previously possible.

Many of the preferred system's users in various standing throughout the trading industry may benefit from the present invention. For example, an individual trader may use the preferred system at his or her trading terminal to track the margin requirement in real-time, thereby allowing the trader to readily use and/or view the margin available for future trades. The trader could also impose limits or restrictions on his or her trading as a result of the computed margin requirement. However, the system is not limited to individual traders, for instance, the preferred system can provide a margin requirement for a group of traders. Limits could then be imposed on the group of traders. Additionally, an administrator/risk manager at a trading house, at a clearing house, at an exchange or some other trading related entity may use the system to calculate margin requirements for one or more traders. They can use the preferred system, for example, to determine whether a trader has enough available margin for an order prior to submitting the order to an exchange. Then, for example, limits based in part on the computed margin requirement may be manually or automatically imposed on a trader or group of traders to restrict one or more of the traders from submitting orders. Other uses of the present invention will become readily apparent to one skilled in the art of trading from the description provided herein.

The present invention now will be described more fully hereinafter with reference to the accompanying drawings, in which preferred embodiments of the invention are shown. This invention may, however, be embodied in many different forms and should not be construed as limited to the embodiments set forth herein.

II. Software Overview

FIG. 1 shows a spread risk calculator 100 for receiving inputs and for determining a margin requirement based on the received inputs. The spread risk calculator 100 shown in the Figure exemplifies its modular architecture. That is, it is designed as a stand-alone unit that can work with other sections of a trading program, or the same module might be able to perform the same task in another program as well. Alternatively, the spread risk calculator 100 can be part of an integrated architecture, in which no particular divisions exist between components. Regardless of whether the spread risk calculator 100 is part of a modular or integrated architecture, the program may reside on any computing device such as a server, workstation, desktop computer, laptop computer, hand-held device, and so on to compute the margin requirement. Additionally, it can be programmed using one or more of a variety of different programming languages known in the art, such as C, C++, Java, Perl, or others. The system may also be programmed using a third-party software program, such as a well-known spreadsheet application provided by Microsoft® Excel.

The spread risk calculator 100 is presently programmed to receive at least some of the following inputs. They include base margins such as a base spread margin and a base outright margin (the base spread margin and the base outright margin are together referred to as "Base Margins"), filled net long position ("Filled Net Long Position"), filled net short position ("Filled Net Short Position"), working outright orders ("Working Outright Orders"), working spread orders ("Working Spread Orders For Exchange Spreads"), and an attempted order ("Attempted Order") which is described more below. These inputs may be in the form of parameters that are stored in memory and which are accessed by the spread risk calculator 100. Regardless of how the spread risk calculator 100 receives the inputs, as the input values change, it is preferable that the spread risk calculator 100 at least has access to the updated input values.

An attempted order is an order that a user or trading application is attempting to send to an exchange. Then, the system preferably uses the inventions described herein to determine whether to allow the attempted order to be sent to the exchange based on the margin risk analysis. In the preferred embodiment, the spread risk calculator 100 treats the attempted order as either a working outright order or a spread order. For instance, if a trader attempts to buy an exchange provided spread, the system will preferably treat this input as a working spread order for purposes of the margin requirement calculation. In another instance, if a trader attempts to buy a tradeable object in an outright market, the system will preferably treat this input as a working outright order for purposes of the margin requirement calculation. Then, in either instance, the system could determine whether to send the attempted order to the exchange based on the computed margin requirement and an available margin account balance.

The spread risk calculator 100 is presently programmed to calculate certain variables which are used to compute the margin requirement. Although these variables are described in greater detail below they include maximum leg positions, a total maximum leg position, a number of spreads (also referred to herein as a generic spread number), a number of outrights, and a maximum number of outrights. Using at least these variables, the preferred system then computes a spread margin and an outright margin. The spread margin is based on the number of spreads and the base spread margin value. The outright margin is based on the maximum number of outrights and the base outright margin value. Both the base spread margin value and the base outright margin value are set by the user, trading house, clearing house, and/or exchange. Then, the total margin requirement is the summation of the spread margin and the outright margin. The total margin requirement is output of the spread risk calculator 100.

Figure 2:
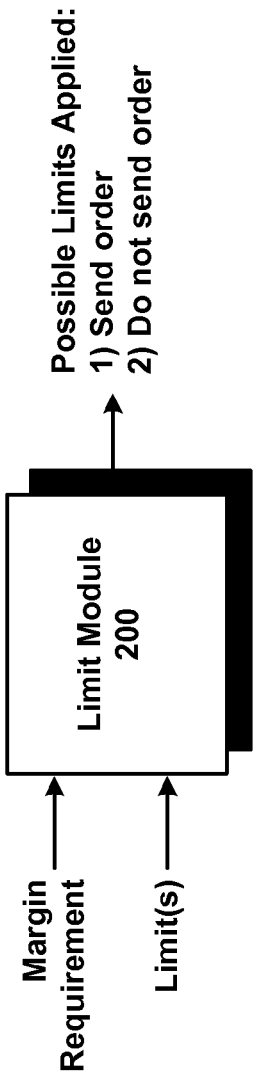
FIG. 2 shows a system in accordance with the preferred embodiment for receiving a computed margin and one or more limits and for determining whether to apply any limits to an order.

FIG. 2 shows a limit module 200 for receiving a total margin requirement and one or more limits for determining whether to send an order, reject an order, or modify an order to fit within the limits. The limit module 200, like the spread risk calculator 100, is part of a modular architecture. Alternatively, the functionality of the limit module 200 may be programmed into an integrated architecture. The limit module 200 may reside on the same machine as the spread risk calculator 100, or it may reside on a separate machine. Any type of computing device such as those enumerated above with respect to the spread risk calculator 100 can be used to implement the limit module 200.

The limit module 200 is presently programmed to receive the margin requirement and one or more limits. Limits might include sending the order to the exchange if the margin balance is greater than the margin requirement and/or refraining from sending the order if the margin balance is less than the margin requirement. Then, the limit module 200 can be programmed to send a signal that indicates whether an attempted order should be sent or rejected. If the attempted order is rejected, it is not sent to the exchange. If desired, the rejected order may be deleted or queued for later use depending on how the system is programmed. Limits could be input by a trader or an administrator, for instance.

III. Preferred Methods for Computing a Margin Requirement

As described above, in the preferred embodiment, a spread margin and an outright margin are computed, which when summed together provides a margin requirement. Preferably, the margin requirement is computed every time there is an attempted order. Alternatively, the margin requirement can be computed at any time including when one of the input values changes.

The computed margin requirement can be used in many ways. For instance, as described with respect to FIG. 2, the computed margin requirement is used to limit or restrict the trading of one or more traders. That is, based on the computed margin requirement and one or more pre-set limits (e.g., user defined limits), for instance, an attempted order could be sent to the exchange or an attempted order could be prevented from being sent to the exchange. FIGS. 3 and 4 characterize preferred processes for computing a spread margin and an outright margin, respectively.

FIG. 3 shows a flowchart 300 illustrating a preferred method for computing a spread margin based on a calculated generic spread number. The generic spread number represents the possible number of spreads that could exist based upon the total maximum leg position and the total filled net position. To calculate the generic spread number each tradeable object traded by the trader is being considered as a leg of a spread. The maximum leg position represents the maximum position in each such leg. Examples with actual numbers are described below to illustrate the relationships described in flowchart 300. Additionally, it should be understood that the steps may be arranged in a different order or eliminated altogether unless otherwise noted. For example, according to flowchart 300, the order of steps 302 and 304 may be swapped.

At step 302, the total maximum leg position is determined. In the preferred embodiment, the total maximum leg position is the summation of the maximum leg positions for each tradeable object. The maximum leg position for each tradeable object is equal to the maximum of (absolute value (filled net long position−filled net short position+equivalent buy leg spread position), absolute value (filled net long position−filled net short position−equivalent sell leg spread position)). The equivalent buy leg spread position and the equivalent sell leg spread position are working orders that might be necessary to accomplish a spread order for an exchange provided spread. That is, the preferred system receives a spread order (or an attempted spread order) and preferably breaks down the spread order into equivalent buy/sell leg positions. For example, when a trader buys a March/June spread, the system would generate an equivalent buy position in March and an equivalent sell position in June. However, it is envisioned that some exchanges could break down spread orders into the leg positions and provide such information in its messages to the client devices. In such a case, it would not be necessary for the preferred system to perform the breakdown. Additionally, the equivalent buy/sell leg positions preferably include any attempted spread orders for an exchange provided spread. That is, when a trader attempts to buy or sell an exchange provided spread, the system preferably breaks down the attempted spread order into equivalent buy/sell leg positions.

According to the preferred embodiment, the computation of the maximum leg position does not take into account working orders in the outright markets. Instead, the outright working orders are taken into account in the calculation of the maximum number of outrights described with respect to FIG. 4.

At step 304, outrights is determined. Outrights (e.g., the absolute value of the total net position) represents the number of total outright positions, or equivalently, the number of positions (e.g., buy or sell) that are not considered part of a spread. The outrights is equal to the absolute value of (total filled net long position−the total filled net short position). The total filled net long position is the sum of all filled net long positions for each tradeable object. The total filled net short position is the sum of all filled net short positions for each tradeable object.

At step 306, the number of spreads is determined. In the preferred embodiment, the number of spreads is equal to the (total maximum leg position−outrights)/2. Note that the reason for dividing by two is that a calendar spread contains two legs, which is described more below.

According to the preferred embodiment, the number of spreads is sometimes referred to in this application as the generic spread number because the preferred system does not have to necessarily match leg-to-leg to form identified spreads. For instance, assume tradeable objects "A," "B," "C," and "D" were being traded, where "A" and "B" are legs to "Spread 1" and "C" and "D" are legs to "Spread 2." According to the preferred embodiment, it is not necessary that the legs "A" and "B" are matched to "Spread 1" and it is not necessary that the legs "C" and "D" are matched to "Spread 2." It should be understood, though, that the legs could be matched to particular spreads if programmed to do so.

Once the number of spreads (generic spread number) is determined, it may be used to compute the spread margin by multiplying the number of spreads by a base margin value for spreads. Recall that base margin values for spreads are generally less than base margin values for outright positions. As described above, the total margin required can then be computed by adding the spread margin to the outright margin. Calculation of the outright margin is outlined with respect to FIG. 4.

FIG. 4 shows a flowchart 400 illustrating a preferred method for computing an outright margin based on maximum outrights. Maximum outrights represents the maximum number of outright positions that could be possible with the current configuration of outright market working orders and filled positions. Maximum outrights preferably takes into account both working buy outright orders and working sell outright orders entered by the trader(s) into outright markets.

At step 402, the number of outrights due to working buy outright orders and the total filled net position is determined. For each tradeable object there may be orders working (or resting) in the outright markets. Step 402 preferably takes into consideration any such working buy orders even though they have not been filled. Step 402 results in a number equal to the absolute value of (total filled net position+working buy outright orders).

At step 404, the number of outrights due to working sell outright orders and the total filled net position is determined. Again, for each tradeable object there may be orders working (or resting) in the outright market. Step 404 preferably takes into consideration any such working sell orders even though they have not been filled. Step 404 results in a number equal to the absolute value of (total net position−working sell outright orders).

With respect to steps 402 and 404, the number of outrights due to working buy and sell orders preferably includes any attempted outright orders. That is, when a trader or trading application attempts to send a buy or sell order, the system includes those in the working buy and sell orders. Then, for example, the system can determine whether the order should be sent to the exchange based in part on the computed margin requirement.

At step 406, maximum outrights is determined. In the preferred embodiment, maximum outrights is equal to the maximum of the result from step 402 and the result from step 404.

Once maximum outrights is determined, it may be used to compute the outright margin by multiplying maximum outrights by a base margin value for outright markets. Then, the total margin required can then be computed by adding the spread margin to the outright margin. Note that if a group of traders were being monitored by the system, according to the preferred embodiment, the total margin requirement for each trader is added together to provide a total margin requirement for the entire group.

IV. Examples for Computing a Margin Requirement

FIGS. 5-10 show example inputs and a margin requirement output from a module that operates substantially similar to the spread risk calculator 100 described with respect to FIG. 1. Although the formulas for computing the margin requirement have been introduced above, they are again described below.

Turning now to the Figures. Each of the Figures is filled with example information for trading tradeable objects for the months of March ("MAR"), June ("JUN"), September ("SEP"), and December ("DEC"). The Figures may include information for a greater or fewer number of tradeable objects, and therefore a greater or fewer number of months may be included. Also, the Figures may include information for different tradeable objects, and therefore different months may also be used.

Of course, it should also be understood that a tradeable object may be identified using a variety of different identifiers, and it is not necessary that a tradeable object only be identified by a corresponding month. Also, the tradeable objects illustrated in FIGS. 5-10 are tradeable objects for different delivery months (e.g., expiration dates); however, some types of tradable objects may be listed according to different strike prices instead of delivery months, or they may be listed according to some other relationship.

Inputs into the system include the filled net long position ("Filled Net Long Position"), filled net short position ("Filled Net Short Position"), working buy and sell outright orders for the outright markets ("W Buy" and "W Sell" under "Outright Positions"), and buy and/or sell spread orders for exchange provided spreads in which the system breaks this input down into equivalent positions in the legs of the spread ("W Buy" and "W Sell" under "Positions Based on Spreads"). Alternatively, as described above, an exchange and/or gateway could break this spread order input down and provide the equivalent positions (e.g., "W Buy" and "W Sell") in the legs of the spread.

The Figures additionally show values that are preferably calculated by the system. They include a maximum leg position ("Max Leg Position"), a number of spreads ("Spreads"), a number of outrights ("Outrights"), and maximum number of outrights ("Max Outrights"). Also included are the spread margin base ("S-Margin" "Base=10") and the outright margin base ("O-Margin" "Base=100"). These base values (e.g., "10" and "100") represent an amount of margin required to purchase a particular tradeable object and can be adjusted accordingly. For example, as shown in Figures, the spread margin base has a value of 10, while the outright margin base has a value of 100. Thus, the amount deducted from the trader's margin balance for trading a spread would be one-tenth the amount deducted for trading an outright object of the same price. Of course, these values are merely examples. They can be set to any other values or ratios, and they can be set by various different factors. For example, the values may change depending on the margin base values given by a trading house, clearing house and/or exchange. Another calculated value is the total margin requirement ("Total Margin"). These show the relative margin requirements and the total margin requirement for the trader's outstanding positions. According to the preferred embodiment, the computed margin requirement is preferably output from the module and used accordingly.

The relationships, first introduced with respect to FIGS. 3 and 4, which are used to calculate some of the variables shown in FIGS. 5-10 are described directly below, as shown in the following formulas:

(1) Total Filled Net Long Position=summation of each filled net long position for each of the tradeable objects. In this example, there are "4" months and hence four tradeable objects. For example, total filled net long position=filled net long position for March+filled net long position for June+filled net long position for September+filled net long position for December.

(2) Total Filled Net Short Position=summation of each filled net short position for each of the tradeable objects. For example, total filled net short position=filled net short for March+filled net short for June+filled net short for September+filled net short for December.

(3) W Buy Total (Outright Positions)=summation of each working outright buy order for each of the tradeable objects, or in this example, for each of the 4 months. These represent working orders for tradeable objects.

(4) W Sell Total (Outright Positions)=summation of each working outright sell order for each of the tradeable objects, or in this example, for each of the 4 months. These represent working orders for tradeable objects.

(5) W Buy (Positions Based on Spreads)=represents an equivalent of a working buy order in a leg of a spread offered by an exchange that guarantees fills in both legs (e.g., such as provided by the exchange "LIFFE"). For example, as described above, if a trader places an order to buy one exchange provided March/June spread, that spread order can be represented by a W Buy in March and a W Sell in June. According to the preferred embodiment, the orders that the exchange are entering are shown in the Figures under the "Positions Based on Spreads" column.

(6) W Sell (Positions Based on Spreads)=represents an equivalent of a working sell order in a leg of a spread offered by an exchange that guarantees fills in both legs (e.g., such as provided by the exchange "LIFFE"). See, for example, the discussion above with respect to W Buy (Positions Based on Spreads).

(7) Total Maximum Leg Position=summation of each maximum leg position for each of the tradeable objects, and in this example, for the 4 months.

(8) Maximum Leg Position (e.g., March)=the maximum of (absolute value (Filled Net Long Position−Filled Net Short Position+W Buy (Positions Based on Spreads)), (absolute value of Filled Net Long Position−Filled Net Short Position−W Sell (Positions Based on Spreads)). Maximum leg position is the maximum position possible with respect to filled outright orders, filled spread orders, and working spread orders. Working spread orders are taken into account here as once they are filled, they will be spreads. Recall from FIG. 3, that from this maximum leg position, the number of spreads (generic spreads) can be determined.

(9) Spreads=(Total Maximum Leg Position−Outrights)/2. As described above, this is divided by 2 to account for calendar spreads where there are two legs. This value also represents the generic spread position. In situations where a spread has more than two legs (e.g., butterfly spread with 3 legs or a condor spread with 4 legs), the system preferably breaks the multi-legged spread into a 2-legged spread and then analyzes it according to the relationships described herein. For non net-zero spreads such as a pack, bundle, or strip spread, the system preferably evaluates them as outright positions. Additionally, if the spreads results in a fraction (e.g., 0.5, 1.5, etc.) then a less conservative solution would include rounding down this value (Spreads) to the next closest integer. Alternatively, one could round up to the next closest integer, but that might result in having more spreads and a more conservative estimate of the margin requirement.

(10) Outrights=Absolute value (Total Filled Net Long Position−Total Filled Net Short Position). This is equivalent to the absolute value of (Total Net Position).

(11) Max Outrights=The maximum of (absolute value (Total Filled Net Long Position−Total Filled Net Short Position+W Buy Total (Outrights)), absolute value (Total Filled Net Long Position−Total Filled Net Short Position−W Sell Total (Outrights))).

(12) S-Margin=Spreads*Base (S-Margin). The Base for spreads is set to "10," however, it should be understood that this value could be changed. For example, the base for spreads could be set to some different value. As illustrated in the preferred embodiment, the same base value is used for all spreads, and therefore, all spreads have the same margin requirement. In an alternate embodiment, different spreads can have different base values, and therefore also different margin requirements. This can be used, for example, to take into account the relative risk of different spreads. Spreads that have a closer price correlation between the legs will generally be less risky than spreads where the price correlation between the legs is not as strong. In one embodiment, the system can use a lower base value, and thereby also a lower margin requirement, for spreads where the legs are more closely correlated. For example, when the expiration dates of the legs of a spread are closer together (e.g., a January 2003/February 2003 spread) there will generally be a stronger price correlation between the legs than in a spread where the expiration dates of the legs are farther apart (e.g., January 2003/August 2003 spread). The system can accordingly use a lower base value in computing the margin requirement for the less risk spread.

(13) O-Margin=Max Outright*Base (O-Margin). The Base for outright positions is set to "100," however, it should be understood that this value can change.

(14) Total Margin=S-Margin+O-Margin. This value represents the computed margin requirement.

In the simplest case, to determine the maximum number of outright positions and/or spread positions, the system preferably examines the computed total net long and total net short values. The lesser of the of the two values represents the generic spread number; the difference between both preferably constitutes the maximum outrights. In other situations, the system preferably takes into account working orders in the outright markets and/or working orders in the spread market when computing the generic spread number and the maximum number of outrights. In such cases, the generic spread position (or "Spreads") can be found using equation (9) above. The maximum number of outrights (or "Max Outfights") can be found using equation (11) above. Some examples are provided below to assist in illustrating some of the previously described relationships.

A. EXAMPLE 1

FIG. 5 shows a working buy order placed in an outright market for March. Once the order is placed (note that the order could be an attempted order), the maximum outright position changes to "1." The maximum outright position would occur if the order fills, thereby generating a one outright position for the trader. Note that the outright value is "0," because the buy order is still working and has not yet been filled. Thus, while the order is pending the trader has no outright positions. The O-Margin position is 100*1=100. The total position is 0+100=100. The total position represents the margin requirement of "100." If the working buy order was an attempted order, the preferred system could determine based on the margin requirement and the available margin balance as to whether the order could be forwarded to an exchange.

B. EXAMPLE 2

FIG. 6 shows the same working buy order placed in FIG. 5, and in addition it shows a working sell order placed in an outright market for June. After placing the sell order, the trader still has no outrights because neither order has yet to be filled. Thus, the outrights value remains at 0. The maximum outrights also remains 1, which would occur if either the buy order or the sell order were filled thereby generating either a net long or a net short position (depending on which order fills) for the trader.

If both the buy order and the sell order were to fill, the trader would seemingly have two outrights. This would not be the case, however, because if both orders filled then the trader would hold a net long position in one month and a net short position in another month. The two outright positions would combine to form a spread, with one leg of the spread being the March buy order and the second leg of the spread being the June sell order. Although both are held as outright positions, the practical effect of these two countervailing positions is to hedge the trader's risk the same as if trader traded a spread with the same two legs. This occurs in spite of the fact that the trader traded the legs in an outright market instead of simply trading the spread in a spread market. The O-Margin position remains "100" and the total position remains "100." The margin requirement is "100."

C. EXAMPLE 3

FIG. 7 shows that the working buy order placed in FIG. 5 has been filled and the working sell order placed in FIG. 6 remains in the market. The outrights value now becomes "1," because the buy order filled and the trader now holds one outright position. The maximum outrights remains "1." As previously described, the maximum outrights for this example occurs if either the buy order or the sell order fills, thereby generating one outright for the trader. If both orders fill, the two would combine to form a spread instead of two outright positions.

The maximum leg position for March becomes "1." Note, however, that the maximum leg position for June remains at "0." The margin requirement remains at "100."

D. EXAMPLE 4

FIG. 8 shows that the working sell order placed in FIG. 7 has been filled. The number of outrights is "0" since the total net long and the total net short are equal. Thus, instead of being treated as two separate outright positions, the March net long position combines with the June net short position to create a spread. The total maximum leg position becomes "2."

From the total maximum leg position and the number of outrights, the generic spread position can be found. In this example, one spread exists. Hence, the S-Margin position is 10*1=10. The total position is 10+0=10. The margin requirement is "10."

E. EXAMPLE 5

FIG. 9 shows that a working buy March/June spread order was entered. The total maximum leg position now goes to "4." The total outrights is still "0," but the number of spreads goes to "2." One spread from the filled positions (net long and net short) and one spread from the working buy/sell spread. Therefore, the S-Margin position becomes 10*2=20. The total position is 20+0=20. The margin requirement is "20."

F. EXAMPLE 6

FIG. 10 shows that a working buy March/June spread order was entered and filled. So, the total net long is "2" and the total net short is "2." The total maximum leg position remains at "4." The total outrights is still "0," but the number of spreads remains at "2." The S-Margin position is 10*2=20. The total position is 20+0=20. The margin requirement is "20."

V. Displaying Relevant Information

The variables described in this application may be displayed. For instance, the variables including inputs into the system and outputs from the system can be displayed on a graphical user interface (GUI). The GUI can include any visual computer environment that represents components of the system with graphical images, such as icons, menus, and dialog boxes on the screen. Some examples of how and/or why one might display such information are described directly below, but additional reasons for displaying such information would be realized by one skilled in the art of trading upon reading the description herein.

According to one example, a trader can run the system in conjunction with other software that the trader uses to connect to an exchange and execute trades. While the trader interacts with the exchange using the other software, the trader can simultaneously view the information to track the margin requirements for the trader's positions and working orders. This allows the trader to conveniently view his or her current margin balance, as it is updated in real-time. Limits which are imposed on the trader may also be displayed so as to inform the trader when a limit has been reached.

In another example, a group of traders can run the system and view the information as the system tracks the margin requirement for each of the traders and/or tracks the margin requirement for the entire group. The margin requirement for the entire group could be just the sum of the margin requirements for each trader. This allows the traders to view their margin balance as a group, as it is updated in real-time. Similar to individual traders, limits which are imposed on the traders may be displayed to inform them when a limit has been reached.

In yet another example, an administrator or another user at a trading house, clearing house, exchange, or other entity can view the margin requirements for a particular trader or a group of traders. The spreadsheet can be updated in real-time, and thus the administrator or other user can view the trader's (or traders') changing margin requirements.

VI. Conclusion

The preferred embodiment described herein provides a quick and efficient way of computing risk associated with outright positions and spread positions for risk purposes. Current SPAN algorithms and similar risk management solutions are often too complicated and time consuming to be used for real time (or near real time) pre-trade spread risk management. Therefore, a system and method were described herein to calculate the risk based in part on working outright orders and working spread orders for exchange traded spreads. A generic spread number is determined in addition to a maximum outrights value, in which a margin requirement is computed. The computed margin requirement can be used in any fashion known to one of ordinary skill in the art such as by limiting the trading of one or more traders.

It should be understood that the programs, processes, methods and apparatus described herein are not related or limited to any particular type of computer or network apparatus (hardware or software), unless indicated otherwise. Various types of general purpose or specialized computer apparatus may be used with or perform operations in accordance with the teachings described herein. While various elements of the preferred embodiments have been described as being implemented in software, in other embodiments hardware or firmware implementations may alternatively be used, and vice-versa.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more, fewer or other elements may be used in the block diagrams.

The claims should not be read as limited to the described order or elements unless stated to that effect. In addition, use of the term "means" in any claim is intended to invoke 35 U.S.C. §112, paragraph 6, and any claim without the word "means" is not so intended. Therefore, all embodiments that come within the scope and spirit of the following claims and equivalents thereto are claimed as the invention.

The invention claimed is:

1. A system including:
   a computing device,
   wherein the computing device is configured to determine a total maximum leg position based on maximum leg positions for each of one or more tradeable objects, wherein the maximum leg positions represent a maximum position in each leg;
   wherein the computing device is configured to determine a number of total outright positions based on a total filled net long position and a total filled net short position, wherein the number of total outright positions represents the number of positions that are not considered part of a spread;
   wherein the computing device is configured to determine a number of spreads based on (the total maximum leg position–the number of total outright positions)/2, wherein the number of spreads represents a generic spread position;
   wherein the computing device is configured to determine a first margin requirement based on the number of spreads and a first base margin value;
   wherein the computing device is configured to determine a maximum number of outrights based on a number of outrights due to working buy outright orders and a number of outrights due to working sell outright orders, wherein the maximum number of outrights represents the maximum number of outright positions possible with a current configuration of outright market working orders and filled positions;
   wherein the computing device is configured to determine a second margin requirement based on the maximum number of outrights and a second base margin value;
   wherein the computing device is configured to determine a total margin requirement based on the first margin requirement and the second margin requirement; and
   wherein the computing device is configured to provide the total margin requirement, wherein a decision to allow an order to be sent is based on an available margin balance and the total margin requirement.

2. The system of claim 1, wherein the total maximum leg position is the sum of the maximum leg positions for each of the one or more tradeable objects.

3. The system of claim 1, wherein the maximum leg position for each of the one or more tradeable objects is based on a filled net long position, a filled net short position, an equivalent buy leg spread position, and an equivalent sell leg spread position.

4. The system of claim 3, wherein a maximum leg position for one of the one or more tradeable objects is equal to maximum(absolute value(filled net long position–filled net short position+equivalent buy leg spread position), absolute value(filled net long position−filled net short position−equivalent sell leg spread position)).

5. The system of claim 3, wherein the equivalent buy leg spread position and the equivalent sell leg spread position are provided by an exchange.

6. The system of claim 1, wherein the number of total outright positions is equal to absolute value(the total filled net long position−the total filled net short position).

7. The system of claim 1, wherein the total filled net long position is based on filled net long positions for each of the one or more tradeable objects, wherein the total filled net short position is based on filled net short positions for each of the one or more tradeable objects.

8. The system of claim 7, wherein the total filled net long position is the sum of all filled net long positions for each of the one or more tradeable objects, wherein the total filled net short position is the sum of all filled net short positions for each of the one or more tradeable objects.

9. The system of claim 1, wherein the number of spreads is equal to (the total maximum leg position−the number of total outright positions)/2.

10. The system of claim 1, wherein the first margin requirement is equal to (the number of spreads * the first base margin value).

11. The system of claim 1, wherein the first base margin value is specified by one of a user, a trading house, a clearing house, and an exchange.

12. The system of claim 1, wherein the maximum number of outrights is equal to maximum(the number of outrights due to working buy outright orders, the number of outrights due to working sell outright orders).

13. The system of claim 1, wherein one of the number of outrights due to working buy outright orders and the number of outrights due to working sell outright orders includes the order.

14. The system of claim 1, wherein the number of outrights due to working buy outright orders is based on a total filled net position and a number of working buy outright orders, wherein the number of outrights due to working sell outright orders is based on the total filled net position and a number of working sell outright orders.

15. The system of claim 14, wherein the number of outrights due to working buy outright orders is equal to absolute value(the total filled net position+the number of working buy outright orders), wherein the number of outrights due to working sell outright orders is equal to absolute value(the total filled net position−the number of working sell outright orders).

16. The system of claim 1, wherein the second margin requirement is equal to (the maximum number of outrights * the second base margin value).

17. The system of claim 1, wherein the second base margin value is specified by one of a user, a trading house, a clearing house, and an exchange.

18. The system of claim 1, wherein the total margin requirement is equal to (the first margin requirement+the second margin requirement).

19. The system of claim 1, wherein the instructions are further executable to display the total margin requirement.

20. The system of claim 1, wherein the total margin requirement is determined for a group of traders.

* * * * *